United States Patent [19]

Henrici et al.

[11] Patent Number: 5,221,461

[45] Date of Patent: Jun. 22, 1993

[54] ANTIOXIDANT COMPOSITIONS AND METHODS USING CATECHOL COMPOUNDS AND ORGANIC ACID COMPOUNDS

[75] Inventors: Inge K. Henrici, Spring; Dwight K. Reid, Houston, both of Tex.

[73] Assignee: Betz Laboratories, Inc., Trevose, Pa.

[21] Appl. No.: 895,745

[22] Filed: Jun. 9, 1992

[51] Int. Cl.$^5$ ............................................... C07C 7/20
[52] U.S. Cl. ............................ 208/48 AA; 252/404; 252/407; 252/183.12; 585/3; 585/866; 585/952
[58] Field of Search ............. 585/3, 866; 208/48 AA; 252/404, 407, 183.12

[56] References Cited

U.S. PATENT DOCUMENTS

| | | | |
|---|---|---|---|
| 3,907,745 | 9/1975 | Bsharah et al. | 260/45.9 |
| 4,061,545 | 12/1977 | Watson | 203/9 |
| 4,390,198 | 6/1968 | Leston | 585/3 |
| 4,456,526 | 6/1984 | Miller et al. | 208/48 AA |
| 4,466,905 | 8/1984 | Butler et al. | 252/403 |
| 4,654,450 | 3/1987 | Miller | 208/48 AA |
| 4,720,566 | 1/1988 | Martin | 558/306 |
| 4,929,778 | 5/1990 | Roling | 585/3 |
| 4,965,326 | 10/1990 | Horpel et al. | 585/3 |

*Primary Examiner*—Asok Pal
*Attorney, Agent, or Firm*—Alexander D. Ricci; Gregory M. Hill

[57] ABSTRACT

A method for inhibiting fouling during the elevated temperature processing of hydrocarbon comprising adding to the hydrocarbon a composition comprising a catechol having the structure:

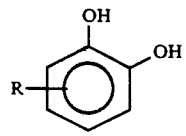

wherein R is H or $C_1$–$C_{10}$ alkyl and, an organic acid.

10 Claims, No Drawings

ANTIOXIDANT COMPOSITIONS AND METHODS USING CATECHOL COMPOUNDS AND ORGANIC ACID COMPOUNDS

FIELD OF THE INVENTION

This invention relates to antioxidant compositions and methods of use in petroleum and petrochemical processes to reduce and/or control the formation of undesired polymers which foul equipment surfaces.

BACKGROUND OF THE INVENTION

Fouling can be defined as the accumulation of unwanted matter on heat transfer surfaces. This deposition can be very costly in refinery and petrochemical plants since it increases fuel usage, results in interrupted operations and production losses and increases maintenance costs.

Deposits are found in a variety of equipment: preheat exchangers, overhead condensers, furnaces, heat exchangers, fractionating towers, reboilers, compressors and reactor beds. These deposits are complex but they can be broadly characterized as organic and inorganic. They consist of metal oxides and sulfides, soluble organic metals, organic polymers, coke, salt and various other particulate matter. Chemical antifoulants have been developed that effectively combat fouling.

The chemical composition of organic foulants is rarely identified completely. Organic fouling is caused by insoluble polymers which sometimes are degraded to coke. The polymers are usually formed by reactions of unsaturated hydrocarbons, although any hydrocarbon can polymerize. Generally, olefins tend to polymerize more readily than aromatics, which in turn polymerize more readily than paraffins. Trace organic materials containing hetero atoms such as nitrogen, oxygen and sulfur also contribute to polymerization.

Polymers are generally formed by free radical chain reactions. These reactions, shown below, consist of two phases, an initiation phase and a propagation phase. In Reaction 1, the chain initiation reaction, a free radical represented by R, is formed (the symbol R can be any hydrocarbon). These free radicals, which have an odd electron, act as chain carriers. During chain propagation, additional free radicals are formed and the hydrocarbon molecules (R) grow larger and larger (see Reaction 4), forming the unwanted polymers which accumulate on heat transfer surfaces.

Chain reactions can be triggered in several ways. In Reaction 1, heat starts the chain. Example: When a reactive molecule such as an olefin or a diolefin is heated, a free radical is produced. Another way a chain reaction starts is shown in Reaction 3. Metal ions initiate free radical formation here. Accelerating polymerization by oxygen and metals can be seen by reviewing Reactions 2 and 3.

As polymers form, more polymers begin to adhere to the heat transfer surfaces. This adherence results in dehydrogenation of the hydrocarbon and eventually the polymer is converted to coke.

1. Chain Initiation

2. Chain Propagation a. 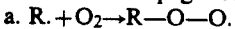

b. 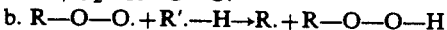

3. Chain Initiation a. 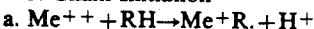

b. 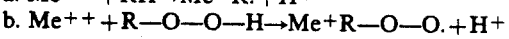

4. Chain Termination a. 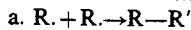

b. 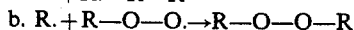

In refineries, deposits usually contain both organic and inorganic compounds. This makes the identification of the exact cause of fouling extremely difficult. Even if it were possible to precisely identify every single deposit constituent, this would not guarantee uncovering the cause of the problem. Assumptions are often erroneously made that if a deposit is predominantly a certain compound, then that compound is the cause of the fouling. In reality, oftentimes a minor constituent in the deposit could be acting as a binder, a catalyst, or in some other role that influences actual deposit formation.

The final form of the deposit as viewed by analytical chemists may not always indicate its origin or cause. Before openings, equipment is steamed, waterwashed, or otherwise readied for inspection. During this preparation, fouling matter can be changed both physically and chemically. For example, watersoluble salts can be washed away or certain deposit constituents oxidized to another form.

In petrochemical plants, fouling matter is often organic in nature. Fouling can be severe when monomers convert to polymers before they leave the plant. This is most likely to happen in streams high in ethylene, propylene, butadiene, styrene and other unsaturates. Probable locations for such reactions include units where the unsaturates are being handled or purified, or in streams which contains these reactive materials only as contaminants.

Even through some petrochemical fouling problems seem similar, subtle differences in feedstock, processing schemes, processing equipment and type of contaminants can lead to variations in fouling severity. For example, ethylene plant depropanizer reboilers experience fouling that appears to be primarily polybutadiene in nature. The severity of the problem varies significantly from plant to plant, however. The average reboiler run length may vary from one to two weeks up to four to six months (without chemical treatment).

Although it is usually impractical to identify the fouling problem by analytical techniques alone, this information combined with knowledge of the process, processing conditions and the factors known to contribute to fouling, are all essential to understanding the problem.

There are many ways to reduce fouling both mechanically and chemically. Chemical additives often offer an effective anti-fouling means; however, processing changes, mechanical modifications equipment and other methods available to the plant should not be overlooked.

Antifoulant chemicals are formulated from several materials: some prevent foulants from forming, others prevent foulants from depositing on heat transfer equipment. Materials that prevent deposit formation include antioxidants, metal coordinators and corrosion inhibitors. Compounds that prevent deposition are surfactants which act as detergents or dispersants. Different combinations of these properties are blended together to maximize results for each different application. These "polyfunctional" antifoulants are generally more versatile and effective since they can be designed to combat various types of fouling that can be present in any given system.

Research indicates that even very small amounts of oxygen can cause or accelerate polymerization. Accordingly, anti-oxidant type antifoulants have been developed to prevent oxygen from initiating polymerization. Antioxidants act as chain-stoppers by forming inert molecules with the oxidized free radical hydrocarbons, in accordance with the following reaction:

Chain Termination

Surface modifiers or detergents change metal surface characteristics to prevent foulants from depositing. Dispersants or stabilizers prevent insoluble polymers, coke and other particulate matter from agglomerating into large particles which can settle out of the process stream and adhere to the metal surfaces of process equipment. They also modify the particle surface so that polymerization cannot readily take place.

Antifoulants are designed to prevent equipment surfaces from fouling. They are not designed to clean up existing foulants. Therefore, an antifoulant should be started immediately after equipment is cleaned. It is usually advantageous to pretreat the system at double the recommended dosage for two or three weeks to reduce the initial high rate of fouling immediately after startup.

The increased profit possible with the use of antifoulants varies from application to application. It can include an increase in production, fuel savings, maintenance savings and other savings from greater operating efficiency.

There are many areas in the hydrocarbon processing industry where antifoulants have been used extensively; the main areas of treatment are discussed below.

In a refinery, the crude unit has been the focus of attention because of increased fuel costs. Antifoulants have been successfully applied at the exchangers; downstream and upstream of the desalter, on the product side of the preheat train, on both sides of the desalter makeup water exchanger and at the sour water stripper.

Hydrodesulfurization units of all types experience preheat fouling problems. Among those that have been successfully treated are reformer pretreaters processing both straight run and coker naphtha, desulfurizers processing catalytically cracked and coker gas oil, and distillate hydro-treaters. In one case, fouling of a Unifiner stripper column was solved by applying a corrosion inhibitor upstream of the problem source.

Unsaturated and saturated gas plants (refinery vapor recovery units) experience fouling in the various fractionation columns, reboilers and compressors. In some cases, a corrosion control program combined with an antifoulant program gave the best results. In other cases, an application of antifoulants alone was enough to solve the problem.

Cat cracker preheat exchanger fouling, both at the vacuum column and at the cat cracker itself, has also been corrected by the use of antifoulants.

The two most prevalent areas for fouling problems in petrochemical plants are at the ethylene and styrene plants. In an ethylene plant, the furnace gas compressors, the various fractionating columns and reboilers are subject to fouling. Polyfunctional antifoulants, for the most part, have provided good results in these areas. Fouling can also be a problem at the butadiene extraction area. Both antioxidants and polyfunctional antifoulants have been used with good results.

In the different design butadiene plants, absorption oil fouling and distillation column and reboiler fouling have been corrected with various types of antifoulants.

Chlorinated hydrocarbon plants, such as VCM, EDC and perchloroethane and tri-chloroethane have all experienced various types of fouling problems. The metal coordinating/antioxidant-type antifoulants give excellent service in these areas.

SUMMARY OF THE INVENTION

This invention relates to a method and composition for controlling the formation of polymers in petroleum or petrochemical processing systems which comprises an antioxidant composition comprising a catechol compound and an organic acid. More particularly, this invention relates to a method and composition for controlling the formation of polymers and the subsequent fouling of equipment surfaces in petroleum or petrochemical processing systems which comprises an antioxidant composition comprising an alkyl catechol and an organic acid.

DESCRIPTION OF THE RELATED ART

U.S. Pat. No. 4,466,905, Butler et al., teaches a polymer inhibiting composition and process for inhibiting the polymerization of vinyl aromatic compounds. This patent teaches the use of a co-inhibitor composition during the heating of vinyl aromatic compounds. The co-inhibitors comprise 2,6-dinitro-p-cresol (DNPC) and a phenylenediamine compound. This composition and process must employ the addition of oxygen to the distillation system to work properly.

U.S. Pat. No. 3,907,745, Bsharah et al., teaches a synergistic antioxidant system for use in polymer system susceptible to oxidation. This system comprises a combination of an antioxidant such as a phenylenediamine and a chelating agent or metal deactivator such as a polyamine. This combination is directed for use in natural rubber and synthetic rubber-like polymer systems.

U.S. Pat. No. 4,720,566 Martin, teaches compositions and methods for inhibiting acrylonitrile polymerization in quench columns of acrylonitrile producing systems. The composition comprises a hydroxylamine and a phenylenediamine compound.

U.S. Pat. No. 4,929,778, Roling, teaches compositions and methods for inhibiting the polymerization of vinyl aromatic monomers during the preparation of monomers and the storage and shipment of products containing such monomers. The composition comprises a phenylenediamine compound and a hindered phenol compound jointly to inhibit polymerization of a vinyl aromatic monomer such as styrene.

U.S. Pat. No. 4,061,545, Watson, teaches a process for the distillation of readily polymerizable vinyl aromatic compounds while reducing the amount of polymerized material in the distillation apparatus. The process utilizes a combination of phenothiazine and tertiarybutylcatechol in the presence of oxygen during the distillation of a vinyl aromatic compound such as styrene.

DETAILED DESCRIPTION OF THE INVENTION

The antioxidant composition of the present invention comprises a catechol having the structure:

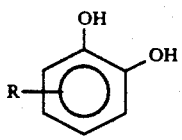

wherein R is H or $C_1$–$C_{10}$ alkyl, and an organic acid. Examples of organic acids which may be utilized are acetic, propionic, butyric, hexanoic, benzoic and naphthanoic.

The amount of the individual ingredients of the antioxidant composition will vary depending upon the severity of the fouling problem encountered due to free radical polymerization as well as the activity of the catechol and the organic acid utilized. Preferably, the weight ratio of catechol to organic acid will be in the range of 30 to 1 to 1 to 30. More preferably, the range will be from about 5 to 1 to 1 to 3, respectively.

The antioxidant composition thus defined may then be added to the hydrocarbon medium being processed to inhibit fouling in an amount of from about 1 to 5000 ppm, by weight, based on actives. The range of 200 to 3500 ppm should be applicable in most cases.

The hydrocarbons where the antioxidant compositions of the present invention are effective are those which contain unsaturated or olefinic components which components are induced to polymerize or react in the presence of oxygen. These hydrocarbons include refinery naphtha and gas oils, pyrolysis gasolines, de-ethanizer bottoms, de-propanizer bottoms, de-butanizer bottoms, de-pentanizer bottoms, isoprene, cycle oils, butadiene, acrylates and vinyl monomers.

EXAMPLES

The invention will now be further described with reference to a number of specific examples which are to be regarded solely as illustrative, and not as restricting the scope of the invention.

The heat induced from test measures the amount of polymer (gum) formed during the elevated temperature processing of a hydrocarbon. The hydrocarbon medium utilized is referred to as pyrolysis gasoline. It is different from finished product gasoline in that it is a product resulting from the recombination reactions during cracking and quench processes followed in an olefin plant.

Pyrolysis gasoline is not itself a finished product since it contains not only a highly olefinic and aromatic hydrocarbon content, but also has a whole host of other hydrocarbons as well as some hydrocarbon impurities. Because of the olefinic ingredients present in pyrolysis gasoline, polymerization potential is quite high.

Fifty milliliters of specific samples of pyrolysis gasoline were heated at 212° F. for four hours under a 100 psi $N_2$ blanket. Using a jet evaporator and a gum bath, the hydrocarbon liquid was blown off with air. The amount of unwashed gum formed was measured by weighing the residue. In order to remove any remnants of the treatment chemicals used, the residue was washed twice with 20 ml of heptane. These values are reported as "washed gum". Table I shows the results of various treatments on the inhibition of polymerization, or rather, gum formation. Different samples of pyrolysis gasoline were utilized, represented as either A, B or C. For each sample of pyrolysis gasoline a value is shown indicating the initial gum present. The control value represents the amount of gum formed without any chemical treatment.

TABLE I

| | Heat Induced Gum Formation | | | |
|---|---|---|---|---|
| Medium | Treatment | ppm active | Unwashed gum mg/100 ml | Washed gum mg/100 ml |
| A | Initial Gum | — | 59.4 | 59.4 |
| | Control | — | 419.8 | 415.6 |
| | TBC* | 500 | 77.0 | 77.0 |
| | citric acid | 500 | 538.0 | 537.6 |
| | 3/2 TBC/citric acid | 500 | 600 | 59.6 |
| B | Initial Gum | — | 36.4 | 34.0 |
| | Control | — | 332.4 | 332.8 |
| | TBC | 250 | 45.0 | 42.6 |
| | 1/1 TBC/citric acid | 500 | 57.8 | 57.0 |
| | 3/2 TBC/propionic acid | 500 | 29.4 | 29.2 |
| | 3/2 TBC/hexanoic acid | 500 | 18.4 | 16.2 |
| C | Initial Gum | — | 54.6 | 54.0 |
| | Control | — | 311.8 | 304.2 |
| | Citric acid | 125 | 287.0 | 282.2 |
| | Propionic acid | 125 | 283.0 | 283.0 |

*TBC = tertiary butylcatechol, used as a representative catechol compound.

The unexpected efficacy of the antioxidant composition of the present invention is well represented by the results shown in the above table. The TBC does well by itself as a polymerization inhibitor. However, the organic acid alone provides no protection against gum production and in some cases, as shown with pyrolysis gasoline A, seems to generate more gum than the control sample. It is clearly surprising, therefore, that the combination of the catechol and an organic acid would result in less gum production than occurred with the catechol alone.

The test method ASTM D-525 (hereby incorporated by reference) covers the determination of the stability of gasoline under accelerated oxidation conditions.

According to the procedure, the sample is oxidized in a bomb initially filled with oxygen. The pressure is read at stated intervals or recorded continuously until the break point is reached. The time required for the sample to reach this point is the observed induction period at the temperature of the test.

The induction period may be used as an indication of the tendency of gasoline to form gum in storage. In accordance with the test, an increase in induction time indicates that the candidate antioxidant material is performing its function. Further difunctional aspects and the actual procedure can be determined from an actual review of the test procedures described in ASTM D-525. The results of the testing are as follows:

TABLE II

| Bomb Oxidation per ASTM D-525 (Pyrogas C) | | |
|---|---|---|
| Treatment | ppm active6 | Induction Time (minutes) |
| Control | — | 15 |
| TBC | 150 | 103 |
| 3/2 TBC/citric acid | 250 | 93 |

Additional tests were conducted to illustrate the effectiveness of the claimed invention. In Table III, below, the results of heat induced gum are shown in which a free radical polymerization initiator (Vazo 67) was added at the beginning of the test to accelerate the production of unwanted gum. The results clearly show the surprising efficacy of the chemical treatment of the present invention over comparative tests conducted using the individual chemicals only.

TABLE III

Heat Induced Gum Formation
(6000 ppm Vaso-67)
Pyrolysis Gasoline D

| Treatment | ppm active | Unwashed Gum mg/100 ml | Washed Gum mg/100 ml |
|---|---|---|---|
| Control | — | 146.8 | 129.3 |
| Citric Acid | 3000 | 100.4 | 94.9 |
| TBC | 3000 | 74.9 | 71.1 |
| 5/3 TBC/citric acid | 2500/1500 | 61.0 | 55.0 |

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What we claim is:

1. An antioxidant composition comprising a catechol having the structure:

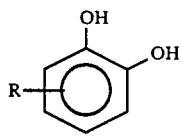

wherein R is H or $C_1$-$C_{10}$ alkyl and, an organic acid.

2. The composition of claim 1 wherein the organic acid is selected from the group consisting of acetic, propionic, butyric, hexanoic, benzoic and naphthanoic.

3. The composition of claim 1 wherein the weight ratio of catechol: organic acid is from about 30:1 to 1:30.

4. The composition of claim 3 wherein the weight ratio of catechol: organic acid is from about 5:1 to 1:3.

5. A method for inhibiting fouling during the elevated temperature processing of hydrocarbon comprising adding to the hydrocarbon being processed a sufficient amount for the purpose of an antioxidant composition comprising a catechol having the structure:

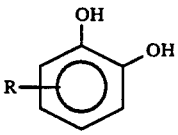

wherein R is H or $C_1$-$C_{10}$ alkyl and, an organic acid.

6. The method of claim 5 wherein the organic acid is selected from the group consisting of acetic, propionic, butyric, hexanoic, benzoic and naphthanoic.

7. The method of claim 5 wherein the weight ratio of catechol: organic acid is from about 30:1 to 1:30.

8. The method of claim 7 wherein the weight ratio of catechol: organic acid is from about 5:1 to 1:3.

9. The method of claim 5 wherein the antioxidant composition is added to the hydrocarbon medium in an amount of from 1 to about 5000 ppm, based on the weight of the hydrocarbon.

10. The method of claim 9 wherein the antioxidant composition is added to the hydrocarbon medium in an amount of from about 200 to 3500 ppm.

* * * * *